United States Patent [19]

Ridenour

[11] Patent Number: 5,541,996
[45] Date of Patent: Jul. 30, 1996

[54] APPARATUS AND METHOD FOR A PSEUDO-RANDOM NUMBER GENERATOR FOR HIGH PRECISION NUMBERS

[75] Inventor: Nancy M. Ridenour, Ft. Wayne, Ind.

[73] Assignee: ITT Corporation, New York, N.Y.

[21] Appl. No.: 353,914

[22] Filed: Dec. 12, 1994

[51] Int. Cl.$^6$ ............................................. H04L 9/00
[52] U.S. Cl. ........................... 380/46; 331/78; 364/717
[58] Field of Search .......................... 380/21, 30, 46; 331/78; 364/717

[56] References Cited

U.S. PATENT DOCUMENTS

| | | | |
|---|---|---|---|
| 4,667,301 | 5/1987 | Chiu et al. | 364/717 |
| 4,685,132 | 8/1987 | Bishop et al. | 380/46 |
| 5,187,676 | 2/1993 | DeVane | 364/717 |
| 5,251,165 | 10/1993 | James, III | 364/717 |
| 5,268,899 | 12/1993 | Brown | 370/85.3 |

OTHER PUBLICATIONS

"Random Number Generators Good Ones Are Hard To Find", *Communications of the ACM*, Oct. 1988.

*Primary Examiner*—Bernarr E. Gregory
*Attorney, Agent, or Firm*—Plevy & Assocaites; Patrick M. Hogan

[57] ABSTRACT

The present invention pseudo-random number generator produces a high precision number suitable for use as a data encryption communications security (COMSEC) key from a highly mobile computer platform. The random number generator is especially suitable for use with military radios and other like applications requiring a random number bit string of high precision. The present invention random number generator produces four pseudo-random numbers of 32-bits and uses only the last 28 bits of each number. A multiplicative linear congruential generator with multiplier 16807 and prime modulus $2^{31}-1$ is used to produce the 32-bit pseudo-random numbers. This generator produces a sequence of remainders of large modulus. The last 28 bits of the 32-bit numbers are combined to produce one high precision number of 112 bits. The first 28-bit number would be shifted left 84 bits, the second 28-bit number would be shifted left 56 bits, the third 28-bit number would be shifted left 28 bits and the last 28-bit number would not be shifted. The three shifted results would be logically ORed together to produce the 112-bit pseudo-random number. The high precision number preserves the statistical nature of the low precision pseudo-random numbers.

26 Claims, 4 Drawing Sheets

APPARATUS AND METHOD FOR A PSEUDO-RANDOM NUMBER GENERATOR FOR HIGH PRECISION NUMBERS

FIELD OF THE INVENTION

The present invention relates to a means for generating random numbers, and more particularly, to a means for generating pseudo-random numbers on a digital computer in accordance with a linear congruent sequence.

BACKGROUND OF THE INVENTION

A random number generator is an apparatus that produces a new number or sequence of numbers in such a way that the results are randomly distributed among the set of possible numbers and independent of the previously generated numbers. Random number generators have many uses in conjunction with computer applications. They are used in computer simulations and communications. For example, such numbers are used in state of the art communications networks for use with retransmission adapters that help to remedy data collisions when they occur. Random number generators are also used frequently in the encryption and decryption of data. For example, in classical cryptography methodology, referred to as single-key cryptography, there is a single piece of private and necessarily secret information—the key—which is many times produced by means of a random number generator. Here, the key is known to and used by the originator of a message to encrypt information into a cipher and is also known to and used by the intended recipient to decrypt the cipher.

There are many applications for data encryption in the public as well as the private sector. Governments are perhaps the most prominent users of data encryption services which many times will be used to ensure secure communications between two locations. The military is a prime example of a government entity which relies heavily on data encryption to ensure the integrity of its communications. The need for secure communications is present at all levels of the military, that is, for communications originating from a top commanding officer down to the field personnel on location during engagement with an enemy. Thus, in order to ensure secure communications at the field and other levels, a new communications security (COMSEC) key will many times have to be generated and implemented between communications devices while in the field. This requires that a random number generator for such applications be operable on equipment which is easily mobilized in the field, for example, a personal computer.

Other random number generators or pseudo-random generators exist which perform random number generation on what is known in the industry as a personal computer (PC), i.e., IBM Personal Computer (PC) or compatible PC. One of the shortcomings of these random number generators, however, is the low precision number (the number of bits) produced when using personal computers as the platform for producing such numbers. For example, most of the random number generators used with the IBM or IBM compatible PCs have the capability of generating only a 32-bit random number. Many of the applications which utilize these random numbers, however, require a random number security key of a much higher precision, i.e., greater number of bits. For example, one of the most commonly used battlefield communication devices, the SINCGARS-FMS family of radios, built and distributed by the ITT Corporation, requires a random number COMSEC key of 112 bits.

It is therefore an objective of the present invention to provide a random number generator that is capable of generating high precision pseudo-random numbers on a highly mobile computer platform.

It is further an object of the present invention to provide a high precision pseudo-random number generator that is operable within a personal computer environment.

SUMMARY OF THE INVENTION

The present invention pseudo-random number generator produces a high precision number suitable for use as a data encryption communications security (COMSEC) key from a highly mobile computer platform. The random number generator is especially suitable for use with military radios and other like applications requiring a random number bit string of high precision. The present invention random number generator produces four pseudo-random numbers of 32 bits and uses only the last 28 bits of each number. A multiplicative linear congruential generator with multiplier 16807 and prime modulus $2^{31}-1$ is used to produce the 32-bit pseudo-random numbers. This generator produces a sequence of remainders of large modulus. The last 28 bits of the 32-bit numbers are combined to produce one high precision number of 112 bits. The first 28-bit number would be shifted left 84 bits, the second 28-bit number would be shifted left 56 bits, the third 28-bit number would be shifted left 28 bits and the last 28-bit number would not be shifted. The three shifted results would be logically ORed together to produce the 112-bit pseudo-random number which can be transmitted to remote locations for use as the COMSEC key. The high precision number preserves the statistical nature of the low precision pseudo-random numbers.

BRIEF DESCRIPTION OF THE FIGURES

For a better understanding of the present invention, reference may be had to the following description of an exemplary embodiment thereof, considered in conjunction with the accompanying drawings, in which.

DETAILED DESCRIPTION OF THE DRAWINGS

Figure 1:
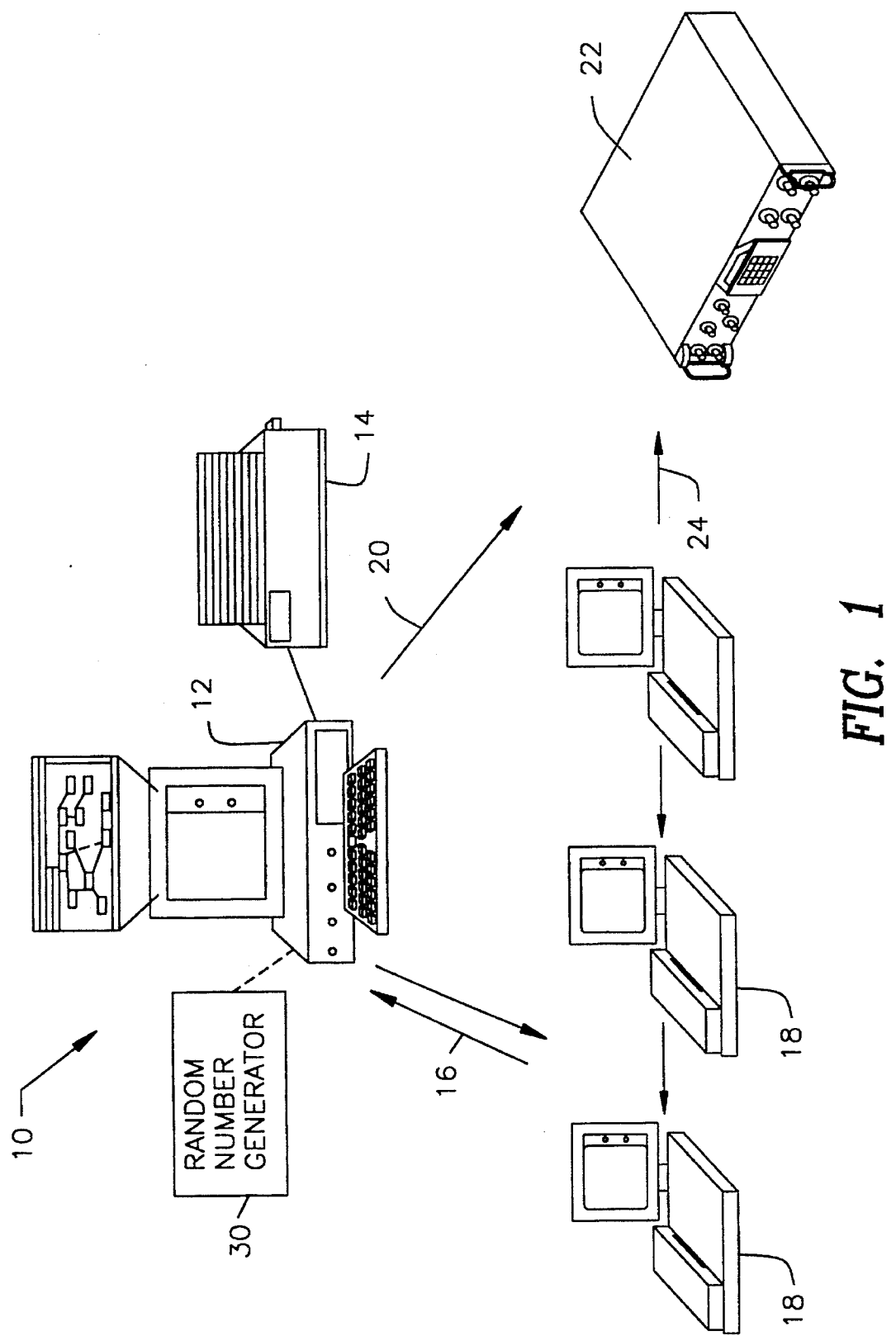
FIG. 1 shows a diagram of a communications management system which utilizes the present invention pseudo-random number generator.

The present invention is a random number generator for generating high precision numbers from a highly mobile platform, such as for example, a personal computer (PC) or like-type digital computer. The invention is advantageously used to generate communications security (COMSEC) keys for data encryption in remote battlefield environments and other applications which require an easily transportable platform. Referring to FIG. 1, there is shown a communications management system (CMS) 10, in conjunction with, the present invention random number generator is used.

The CMS system 10 enables the users of various field radio systems, for example, the SINCGARS (Export) family of ICOM Radios manufactured and distributed by the ITT Corporation, to manage security keys, frequencies, networks and other distribution assets from a Corps to Squad level. The CMS 10 includes a base computer 12, such as for example, a DOS based IBM personal computer (PC) or like compatible PC, the computer being coupled to a printer 14. The computer 10 has a bidirectional communications link 16 between FILL devices 18 and a unidirectional communications link 20 with the remote field radios 22. The FILL devices 18 are essentially relay terminals and are adapted to receive and transmit information regarding the security keys, frequencies and other network data received from the base computer of the CMS system 10. A bidirectional communications link 24 is also established between the field radios 22 and the FILL devices 18. In this way information from the CMS base computer can be relayed directly to the field radios 22 or by way of the FILL devices.

A random number generator 30 is shown in block representation coupled to computer 12. It will be understood that the present invention random number generator 30 can be implemented as part of the computer 12 or can also function as a separate piece of hardware coupled to the computer and tied into the relevant communications channels. In this way COMSEC keys and key tags can be generated from the computer 12 to the field (SINCGARS) radios 22 to establish secure communications between the radios 22 and the FILL devices 18. As can be seen, the capability also exists for direct communications between the base computer 10 and the FILL devices via communications link 16.

The SINCGARS radios 22 used with the CMS system 10 utilize a high precision COMSEC key of 112 bits in length. As was previously mentioned, random number generators of the prior art have not had the capability to produce such high precision random numbers on a highly mobile field transportable personal computer 12. The present invention random number generator solves that problem in the following manner.

Figure 2:
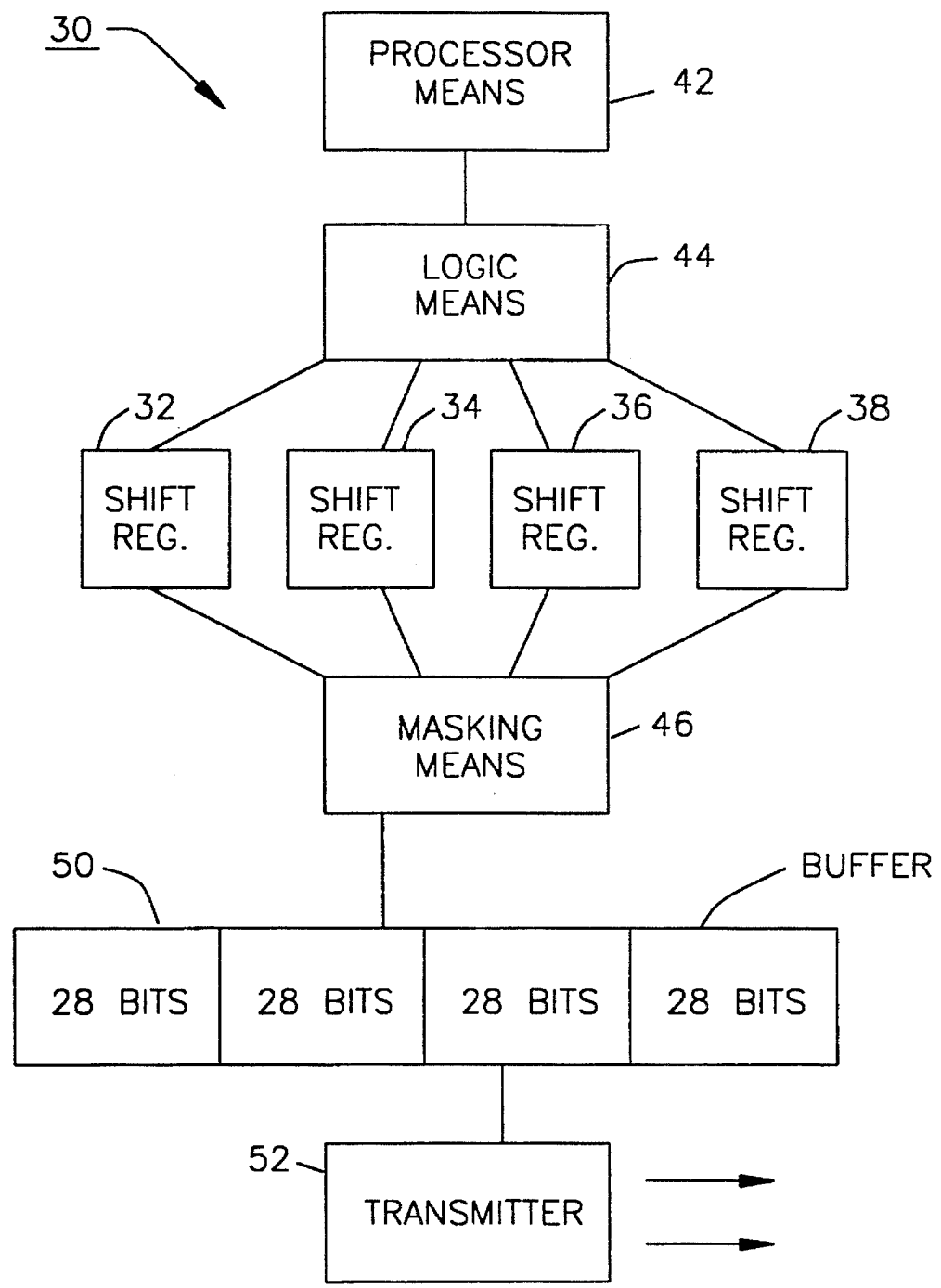
FIG. 2 shows a block diagram of the pseudo-random number generator according to the present invention.

Referring to FIG. 2, there is shown a representation of the random number generator 30 according to the present invention. The random number generator includes a processor 42, and a first shift register 32, second shift register 34, third shift register 36 and fourth shift register 38. Coupled to the processor 42 and each of the shift registers 32, 34, 36, 38 is logic means 44 for performing logical operations, such as AND, OR and exclusive-OR operations, on the contents of the shift registers. Each of the shift registers is in turn is coupled to a masking means 46, which is coupled to a buffer register 50. A transmitter 52 is coupled to the buffer register 50 for transmitting the contents of the buffer, i.e., COMSEC key, to a remote location.

The present invention pseudo-random number generator is implemented using a multiplier 16807 and prime modulus $2^{31}-1$. These generators produce a sequence of remainders of large modulus. The linear transformation used to generate these remainders is as follows:

$$X_{i+1}=(ax_i+b)\bmod m \quad (1)$$

where, $n \geq 0$, a=multiplier, b=increment, and m=modulus.

The above random number generator is described in an article by Stephen K. Park and Keith W. Miller in "Random Number Generators: Good Ones are Hard to Find", found in *Communications of the ACM,* 31 (October '88): 1192. The inventor has determined this random number generator to be a good fit for the 32-bits possible with the instant platform PC computer of the CMS system 10. The Park/Miller article gives the theory on how to implement the linear transformation to achieve random number generation. It will be noted that one of the limitations of the IBM PC computers is that they can only produce numbers so large. Equation (1) above, was modified so that the number generated by the transformation does not produce over-flow. The implementation of this modified Park/Miller pseudo-random number generator in Turbo Pascal (Copyright 1983, 1989) is included in Appendix A.

As shown in Appendix A, the Park/Miller pseudo-random number generator, as implemented is operable to generate a 32-bit random number utilizing the processor 42. The present invention random number generator 30 generates four different 32-bit random numbers and then uses only the last 28 bits of each number. The last 28 bits of the 32-bit numbers are combined to produce one high precision number of 112 bits. The 112-bit high precision number preserves the statistical nature of the lower precision pseudo-random numbers and is suitable for use as a COMSEC key for the SINCGARS radios.

Figure 3A:
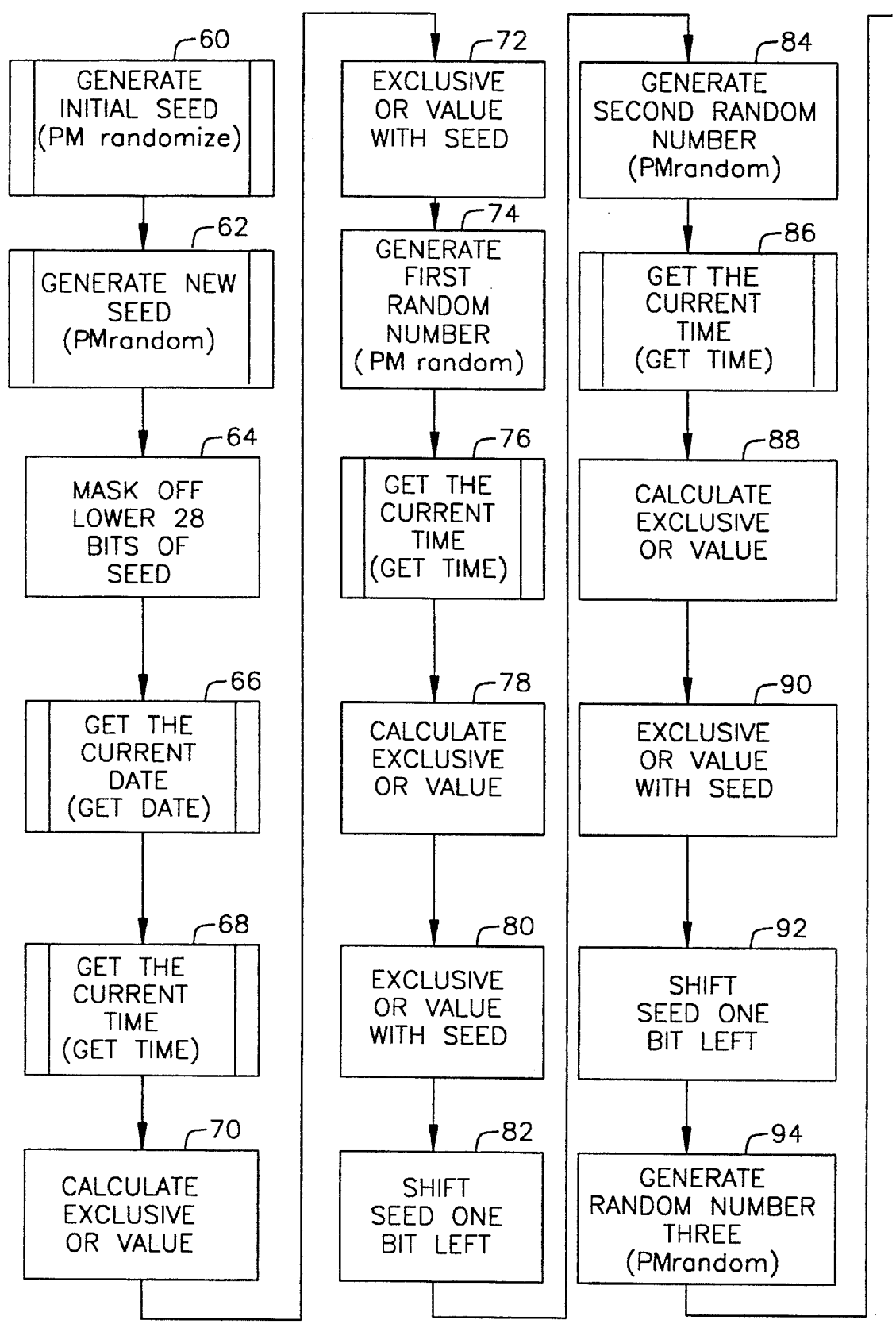
FIG. 3 shows a flow diagram for producing pseudo-random numbers according to the method of the present invention.
Figure 3B:
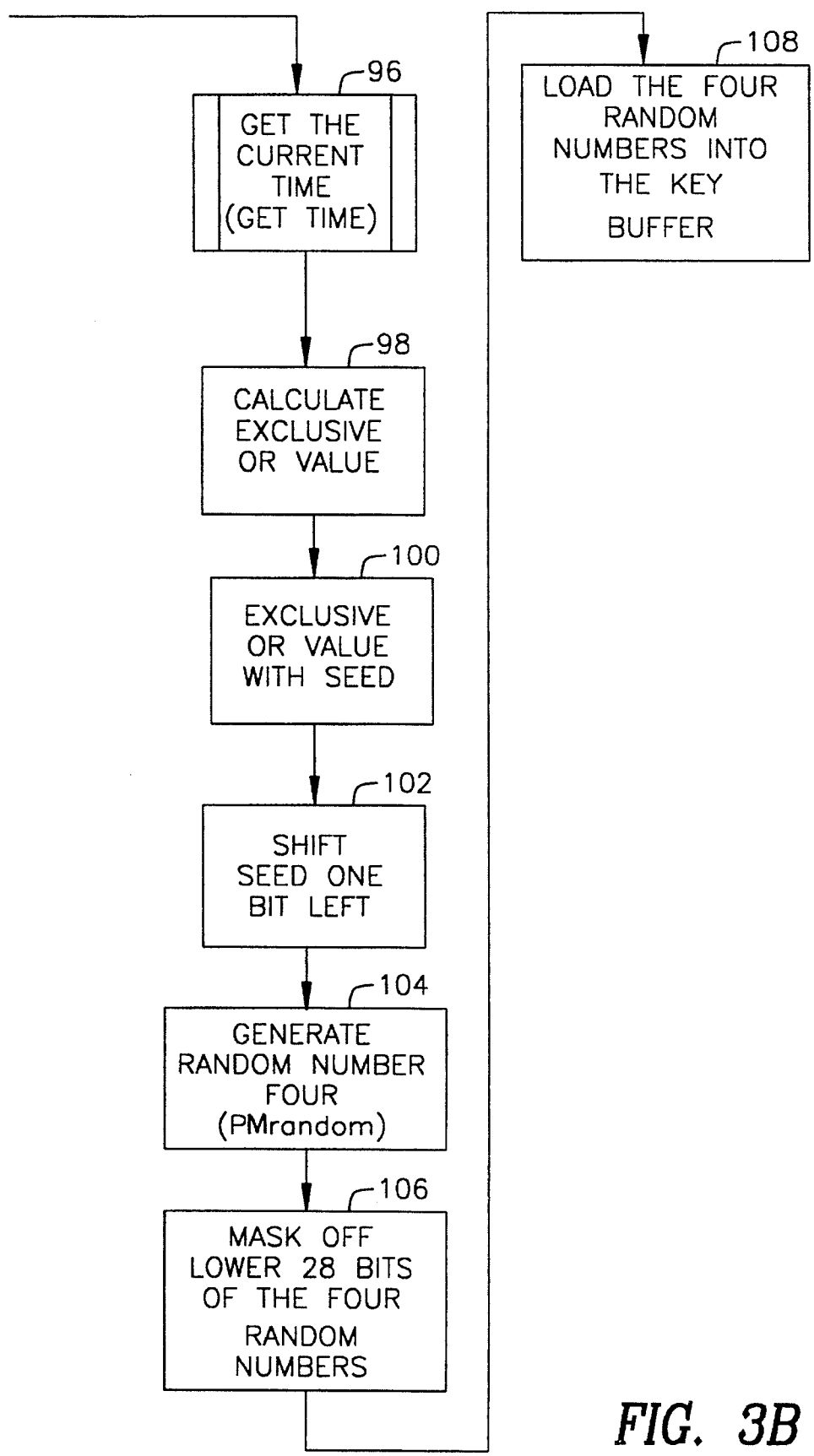

Referring to FIG. 3A and 3B, in conjunction with FIG. 2, there is shown a flow diagram for implementing the method of the present invention key generator 30. Implementation thereof in Turbo Pascal is shown in Appendix B. As can be seen in FIG. 3A and 3B, a first step in implementing the random number generator is to generate an initial seed to start generation of the high precision number as shown in block 60. This is done using the "Randomize" function found in Turbo Pascal (Copyright 1983, 1989), wherein this first random number is obtained from the system clock of the processor 42. This value will be stored in shift register 32. The next step in implementing the key generator 30 at block 62, is to generate a new seed value from the initial seed of block 60 which is stored in register 32. This is done using the Park/Miller random number generator as shown in Appendix A, (hereinafter referred to as "PM-Random"). The first four bits of the new seed value are then masked off to produce a 28-bit number as shown in block 64. This is accomplished in the logic means 44, wherein the new seed is logically ANDed with a predetermined mask number, such as Hex 0FFFFFFF to zero-out and eliminate the first four bits.

A next step in the implementation of the key generator 30 is to exclusive-OR the remaining 28 bits of the new seed value with another random value to produce a further random number. In the preferred embodiment, this entails an exclusive-OR operation with a bit string of the date and time, i.e., day, hour, minutes and seconds as produced in the processor 42. Accordingly, this entails retrieval of the date and time shown in blocks 66 and 68. The instant function is also found as part of the command structure within Turbo Pascal. The value produced by the logic means in exclusive ORing the new seed with the date and time is stored in register 32 and is shown in blocks 70 and 72 of the flow diagram. This value is then retrieved from the register 32 and used to generate the first random number utilizing PM-Random as shown in block 74, wherein the value is again stored in register 32.

The process is continued to generate another 32-bit random number. The second random number is generated by exclusive ORing the seed value used in generating the first random number with the date and time, i.e., day hour minute and seconds, as discussed previously. Since generation of the second random number immediately follows generation of the first random number, only the current time need be retrieved from the processor 42 as shown by block 76, since the date, ideally, will not have changed. The new exclusive-OR value is then calculated by substituting in the current time as shown in block 78. As discussed, the seed from the first random number is exclusive-ORed with the current date and time as shown in block 80 using logic means 44. This value is then stored in shift register 34. The value produced is then shifted one bit left to further randomize the seed, as shown by block 82, wherein the shifted seed is used to as the seed to generate the second random number using PM-Random as shown in block 84. The value of the second random number is stored in shift register 34.

This sequence is continued in a similar manner to generate the third and fourth 32-bit random numbers. The current time is again retrieved from the processor 42 as shown in block 86. An exclusive-OR value is calculated using the current time and date at block 88, and this value is exclusive-ORed with the seed for the second random number at block 90 and stored in shift register 36. This new seed is shifted one bit left as shown at block 92 and is then used to generate a third random number at block 94 using PM-Random, wherein this 32-bit result is stored in shift register 36.

The process is continued in a like fashion for generation of random number four. The current time is retrieved from the processor 42 as shown in block 94. An exclusive-OR value is calculated using the current time and date at block 96, and this value is exclusive-ORed using logic means 44 with the seed for the third random number at block 98 and stored in shift register 38. This new seed is shifted one bit left as shown at block 100 and is then used to generate a fourth random number at block 102 using PM-Random, wherein this 32-bit result is stored in shift register 38.

Once the four 32-bit random numbers have been generated, each random number must be reduced to a 28-bit number in order to eventually achieve the 112 bit high precision number, i.e., 4×28 bits=112 bits. This is accomplished by masking off the lower 28 bits of each number as shown at block 104. A masking means 50 for logically ANDing a mask value, such as Hex 0FFFFFFF, with each corresponding random number can be used. The masked off 28 bits are then sequentially stored (or logically ORed) in proper order within the key buffer 52 as shown in block 106 and transmitted appropriately within the CMS system 10 to produce a high precision COMSEC (communications security) key which is suitable for use with the SINCGARS field radios.

It will be understood that shifting of each of the four random numbers can be accomplished within each of the shift registers 32–38 prior to loading into the key buffer 52 in order to ensure that the 28 remaining bits of each of the random numbers are loaded into the proper location of the buffer 52. That is, subsequent to generation and masking, a first 28-bit number would be shifted left 84 bits, the second 28-bit number would be shifted left 56 bits, the third 28-bit number would be shifted left 28 bits and the last 28-bit number would not be shifted. In this way the shifted random numbers will line up properly when combined to produce the 112-bit pseudo-random number.

Tests were performed using the present invention pseudo-random number generator 30 to determine the statistical distribution of the numbers produced. A test was run using the presently described apparatus and method to generate the four random numbers. One million sets of these numbers were generated ten times. The numbers were counted to see what particular range each would fall within. The data illustrating the distribution of the numbers is given in Appendix C. As can be seen the statistical distribution for each of the ranges are very similar. This would indicate that the occurrence of numbers are quite randomly dispersed over the sample set, which meets the criteria necessary for a true random number generator.

From the above, it should be understood that the embodiment described, in regard to the drawings, is merely exemplary and that a person skilled in the art may make variations and modifications to the shown embodiment without departing from the spirit and scope of the invention. All such variations and modifications are intended to be included within the scope of the invention as defined in the appended claims.

```
Function PMrandom(s : LongInt) : Longint;

Var
  lo, hi, t : Longint;

Const
  m = 2147483647;
  a = 16807;
  q = 127773;   {* m div a *}
  r = 2836;     {* m mod a *}

Begin hi := s div q;
lo := s mod q;
t  := a*lo - r*hi;

If t > 0 Then
    s := t
Else
    s := t + m;

PMrandom := s;

End;

Function PMrandomize(i: word): Longint;

Var
s : Longint;

Const
m = 2147483647;      { Max Long Integer }

Begin

If i <> 0 Then
    s := i
Else
  Begin
  Randomize;
  s := RandSeed;
  End;
s := s mod m;

If s = 0 Then
    inc(s);

PMrandomize := s;
End;
```

{************************************************************************}

*Appendix A.*

```
Procedure GenerateKey;

Var
  Byte1,Byte2,
  Byte3,Byte4    : Byte;
  XorValue       : LongInt;
  RandomNum1     : LongInt;
  RandomNum2     : LongInt;
  RandomNum3     : LongInt;
  RandomNum4     : LongInt;
  i,j,Seed       : LongInt;
  Hour, Minute,
  Second, Sec100,
  Year, Month,
  Day, DayofWeek : Word;
  TempSet        : Array[1..16] Of Byte;

Begin

Seed := PMrandomize(0);           { generate initial seed }
Seed := PMrandom(Seed);           { generate new seed }
Seed := Seed And $0FFFFFFF;       { mask off lower bits }

GetDate(Year, Month, Day, DayofWeek);
GetTime(Hour, Minute, Second, Sec100);

Byte1 := Second And $00FF;
Byte2 := Minute And $00FF;
Byte3 := Hour And $00FF;
Byte4 := Day And $00FF;
XorValue := (Byte4 Shl 12) Or (Byte3 Shl 8) Or
            (Byte2 Shl 4) Or Byte1;
Seed := Seed Xor XorValue;
RandomNum1 := PMrandom(Seed);     { generate random number }

GetTime(Hour, Minute, Second, Sec100);
Byte1 := Second And $00FF;
XorValue := (Byte4 Shl 12) Or (Byte3 Shl 8) Or
            (Byte2 Shl 4) Or Byte1;
Seed := Seed Xor XorValue;
Seed := Seed Shl 1;
RandomNum2 := PMrandom(Seed);     { generate random number }

GetTime(Hour, Minute, Second, Sec100);
Byte1 := Second And $00FF;
XorValue := (Byte4 Shl 12) Or (Byte3 Shl 8) Or
            (Byte2 Shl 4) Or Byte1;
Seed := Seed Xor XorValue;
Seed := Seed Shl 1;

RandomNum3 := PMrandom(Seed);     { generate random number
```

```
GetTime(Hour, Minute, Second, Sec100);
Byte1 := Second And $00FF;
XorValue := (Byte4 Shl 12) Or (Byte3 Shl 8) Or
            (Byte2 Shl 4) Or Byte1;
Seed := Seed Xor XorValue;
Seed := Seed Shl 1;
RandomNum4 := PMrandom(Seed);      { generate random number }

FillSet[2,1] := $24;               { key cell header byte }

RandomNum4 := RandomNum4 And $0FFFFFFF;
RandomNum3 := RandomNum3 And $0FFFFFFF;
RandomNum2 := RandomNum2 And $0FFFFFFF;
RandomNum1 := RandomNum1 And $0FFFFFFF;

For i := 1 To 4 Do      { store random number 4 in temporary }
    Begin               { buffer }
    TempSet[i] := RandomNum4;
    RandomNum4 := RandomNum4 Shr 8;   { shift for next byte }
    End;

RandomNum2 := RandomNum2 Shl 4;
                        { store random number 3 in temporary }
For i := 5 To 8 Do      { buffer }
    Begin
    TempSet[i] := RandomNum3;
    RandomNum3 := RandomNum3 Shr 8;   { shift for next byte }
    End;
For i := 9 To 12 Do     { store random number 3 in temporary }
    Begin               { buffer }
    TempSet[i] := RandomNum2;
    RandomNum2 := RandomNum2 Shr 8;   { shift for next byte }
    End;

RandomNum1 := RandomNum1 Shl 4;
                        { store random number 1 in temporary }
For i := 13 To 16 Do    { buffer }
    Begin
    TempSet[i] := RandomNum1;
    RandomNum1 := RandomNum1 Shr 8;   { shift for next byte }
    End;

i := 16;                { flip bytes }
j := 2;                 { 3 and 1 half bytes per random number }
Repeat
    FillSet[2,j] := TempSet[i];  { load byte in fill buffer }
    j := j + 1;
    i := i - 1;
    If (i = 13) Or (i = 5) Then
        Begin
        FillSet[2,j] := TempSet[i] Or TempSet[i-1];
        i := i - 2;
        j := j + 1;
        End;
Until j = 16;

End;
```

| Trial Number | 1 | 2 | 3 | 4 | 5 | 6 | 7 | 8 | 9 | 10 |
|---|---|---|---|---|---|---|---|---|---|---|
| Number between | | | | | | | | | | |
| 0 & 49941480 | 93654 | 93254 | 92580 | 94113 | 92602 | 94404 | 93211 | 93229 | 93605 | 93656 |
| 49941481 & 99882961 | 93124 | 93634 | 93943 | 93303 | 94247 | 92091 | 94417 | 93624 | 93453 | 93550 |
| 99882962 & 149824442 | 94909 | 93256 | 94357 | 93617 | 93687 | 95881 | 92202 | 93427 | 93724 | 93968 |
| 149824443 & 199765923 | 91480 | 93877 | 93584 | 94132 | 94406 | 92806 | 95137 | 94199 | 93262 | 94090 |
| 199765924 & 249707404 | 99712 | 96739 | 97724 | 96629 | 97405 | 97993 | 96019 | 96635 | 97480 | 97268 |
| 249707405 & 299648885 | 89607 | 91021 | 90885 | 90851 | 91026 | 90239 | 91151 | 90727 | 90235 | 89878 |
| 299648886 & 349590366 | 95136 | 93173 | 93309 | 93587 | 93531 | 93596 | 93412 | 93180 | 93236 | 93429 |
| 349590367 & 399531847 | 92671 | 93097 | 94113 | 93636 | 93513 | 94223 | 93712 | 94503 | 94008 | 94390 |
| 399531848 & 449473328 | 94275 | 94087 | 93469 | 93527 | 93649 | 92549 | 94148 | 92579 | 94293 | 92326 |
| 449473329 & 499414809 | 94379 | 93790 | 93805 | 94596 | 93579 | 94120 | 94280 | 94977 | 92990 | 94678 |

| Range | | | | | | | | | | |
|---|---|---|---|---|---|---|---|---|---|---|
| 499414810 & 549356290 | 93143 | 93576 | 94272 | 92866 | 93701 | 93214 | 94445 | 92646 | 94691 | 93550 |
| 549356290 & 599297771 | 93996 | 93695 | 93264 | 93653 | 93582 | 94261 | 92566 | 94276 | 93026 | 93768 |
| 599297772 & 649239252 | 91839 | 92770 | 92817 | 93353 | 93352 | 92417 | 94348 | 92526 | 93009 | 93929 |
| 649239253 & 699180733 | 94525 | 93848 | 94167 | 92861 | 93329 | 93468 | 92570 | 94551 | 93035 | 92919 |
| 699180734 & 749122214 | 92938 | 93180 | 92630 | 94122 | 93770 | 93250 | 93269 | 93309 | 93766 | 93420 |
| 749122215 & 799063695 | 93738 | 93496 | 93554 | 93144 | 94001 | 93690 | 92645 | 93730 | 92919 | 92401 |
| 799063696 & 849005176 | 93200 | 93296 | 93117 | 93689 | 91998 | 93482 | 93553 | 93163 | 93943 | 93676 |
| 849005177 & 898946657 | 92216 | 93641 | 92457 | 92444 | 92885 | 91814 | 93221 | 93002 | 92668 | 92374 |
| 898946658 & 948888138 | 94073 | 93083 | 93772 | 93371 | 92400 | 93858 | 93807 | 93076 | 92678 | 93657 |
| 948888139 & 998829619 | 92139 | 93128 | 92710 | 92933 | 94172 | 92596 | 93387 | 92479 | 93662 | 93355 |
| 998829620 & 1048771100 | 94646 | 93248 | 93362 | 92971 | 93176 | 92857 | 92441 | 93833 | 92519 | 94022 |
| 1048771101 & 1098712581 | 91341 | 93525 | 93139 | 93376 | 92856 | 94079 | 93649 | 93027 | 93609 | 93184 |
| 1098712582 & 1148654062 | 94042 | 92736 | 93801 | 92373 | 93350 | 92739 | 92180 | 93723 | 92859 | 92322 |
| 1148654063 & 1198595543 | 92393 | 92992 | 92799 | 93818 | 92971 | 93810 | 92863 | 92379 | 92947 | 92985 |
| 1198595544 & 1248537024 | 93769 | 93193 | 92734 | 92328 | 93182 | 92789 | 93874 | 93640 | 92852 | 92729 |

| Range | | | | | | | | | | |
|---|---|---|---|---|---|---|---|---|---|---|
| 1248537025 & 1298478505 | 94588 | 92462 | 93339 | 93508 | 93830 | 93673 | 93054 | 93426 | 94139 | 94220 |
| 1298478506 & 1348419986 | 92209 | 93478 | 93043 | 93591 | 92712 | 91932 | 93782 | 92502 | 93484 | 92559 |
| 1348419987 & 1398361467 | 93580 | 92766 | 93453 | 93307 | 93027 | 94793 | 92836 | 93334 | 92668 | 94079 |
| 1398361468 & 1448302948 | 92129 | 92524 | 92818 | 92956 | 93470 | 91431 | 93682 | 93414 | 93267 | 92498 |
| 1448302949 & 1498244429 | 94195 | 93256 | 92529 | 93044 | 91743 | 94547 | 92493 | 92961 | 93533 | 93062 |
| 1498244430 & 1548185910 | 91420 | 92435 | 92835 | 93218 | 93405 | 91422 | 93478 | 92297 | 92388 | 93359 |
| 1548185911 & 1598127391 | 94148 | 93555 | 93454 | 92417 | 94028 | 93715 | 92311 | 93467 | 92683 | 92023 |
| 1598127392 & 1648068872 | 91340 | 92568 | 92928 | 93928 | 92108 | 91721 | 92179 | 93066 | 92616 | 93473 |
| 1648068873 & 1698010353 | 93290 | 92630 | 93056 | 92153 | 92646 | 92147 | 93006 | 92417 | 92481 | 92052 |
| 1698010354 & 1747951834 | 92121 | 92984 | 91941 | 93713 | 91765 | 93231 | 92661 | 92189 | 92309 | 92529 |
| 1747951835 & 1797893315 | 93093 | 92859 | 92614 | 92053 | 92411 | 92347 | 92568 | 91522 | 93036 | 92990 |
| 1797893316 & 1847834796 | 92792 | 92345 | 92367 | 92198 | 93095 | 93246 | 91962 | 94138 | 92508 | 93084 |
| 1847834797 & 1897776277 | 91313 | 91965 | 92270 | 92199 | 91696 | 92595 | 93038 | 92241 | 92803 | 92105 |
| 1897776278 & 1947717758 | 92456 | 92404 | 92215 | 91993 | 92329 | 92361 | 91546 | 92535 | 92084 | 92348 |
| 1947717759 & 1997659239 | 92820 | 92426 | 92569 | 92739 | 91681 | 92705 | 91747 | 91395 | 92344 | 91841 |
| 1997659240 & 2047600720 | 92185 | 92573 | 92288 | 92407 | 92991 | 92681 | 92308 | 93569 | 92105 | 92155 |
| 2047600721 & 2097542201 | 92217 | 92903 | 92156 | 92516 | 92486 | 92677 | 93217 | 91955 | 93100 | 93049 |
| 2097542202 & 2147483648 | 87159 | 88532 | 87761 | 86767 | 88207 | 86550 | 87625 | 87132 | 87983 | 87050 |

What is claimed is:

1. An apparatus for generating a high precision pseudo-random number, said pseudo-random number indicative of a communications security key for data encryption, said apparatus comprising:

means for generating intermediate random numbers according to a predetermined mathematical transformation;

means for storing said intermediate random numbers including means for processing said intermediate numbers into a second predetermined form;

means for masking a predetermined portion of said intermediate random numbers to thereby form reduced intermediate random numbers; and means for storing multiple ones of said reduced intermediate random numbers together in a security key buffer to produce said high precision number for use as said communications security key.

2. The apparatus of claim 1, wherein said predetermined mathematical transformation is a linear congruential transformation.

3. The apparatus of claim 2, wherein said linear congruential transformation is in the form of:

$$X_{i+1}=(ax_i+b) \bmod m$$

where, $n \geq 0$, a=multiplier, b=increment, and m=modulus.

4. The apparatus of claim 1, further including output means for outputting said high precision number to a remote location for use as a data encryption communications security key.

5. The apparatus of claim 1, wherein said means for storing said intermediate numbers includes shift register means for shifting a first stored intermediate random number 84 bit places to the left, for shifting a second stored intermediate random number 56 bit places to the left, and for shifting a third stored intermediate random number 28 bit places to the left, wherein a fourth intermediate random number stored in said shift register means remains unshifted.

6. The apparatus of claim 5, wherein said means for storing said reduced intermediate numbers stores said reduced intermediate numbers to produce a 112-bit high precision number.

7. An apparatus for generating a high precision random number communications security key used in a data encryption system, said data encryption system encrypts a transmitted message to a remote receiver wherein said message is decrypted by said receiver if said security key is known at said receiver, said apparatus comprising:

processor means for generating intermediate random numbers according to a linear congruential transformation;

a plurality of shift register means coupled to said processor means for storing and shifting said intermediate random numbers;

logic means coupled to each of said shift register means for performing logical operations on numbers stored in said shift register means;

masking means coupled to said shift register means for masking off a predetermined portion of said intermediate random numbers to thereby form reduced intermediate random numbers;

combining means coupled to said shift register means for combining said reduced intermediate random numbers into said high precision random number comprising multiple reduced intermediate random numbers; and storage buffer means for storing said high precision number.

8. The apparatus according to claim 7, further including output means for outputting said high precision number to a remote location for use as a data encryption communications security key.

9. The apparatus according to claim 7, wherein said linear congruential transformation is in the form of:

$$X_{i+1}=(ax_i+b) \bmod m$$

where, $n \geq 0$, a=multiplier, b=increment, and m=modulus.

10. The apparatus according to claim 9, wherein the multiplier is 16807 and the prime modulus is $2^{31}-1$.

11. The apparatus according to claim 7, wherein said processor means generates 32-bit pseudo-random intermediate numbers.

12. The apparatus according to claim 11, wherein said plurality of shift register means comprises a first shift register for shifting a first stored intermediate random number 84 bit places to the left, a second shift register for shifting a second stored intermediate random number 56 bit places to the left, a third shift register for shifting a third stored intermediate random number 28 bit places to the left and a fourth shift register for storing a fourth intermediate random number which remains unshifted.

13. The apparatus according to claim 12, wherein said combining means is operable to combine said intermediate random numbers in said first through fourth shift registers into a 112-bit high precision number.

14. The apparatus according to claim 11, wherein said masking means masks off the four most significant bits of an intermediate random number, thereby leaving a 28-bit reduced intermediate random number.

15. The apparatus according to claim 7, wherein said processor means is a portable digital computer.

16. A method for generating a high precision communications security key for use in a data encryption system, said data encryption system encrypts a transmitted message to a remote receiver, wherein said message is decrypted by said receiver if said security key is known at said receiver, said method comprising the steps of:

generating a series of intermediate random numbers according to a linear congruential transformation;

storing said intermediate random numbers in a plurality of shift register means;

shifting said intermediate random numbers stored in said shift register means in order that the bit strings of said intermediate random numbers are combined side by side without any gaps in between;

combining said intermediate random numbers that have been shifted into a high precision random number formed from multiple intermediate random numbers;

storing said high precision random number in a communications security key buffer.

17. The method of claim 16, further including the step of masking off predetermined portions of said intermediate random numbers in order to form reduced intermediate random numbers.

18. The method of claim 17, wherein said random intermediate numbers are 32-bits in length, and wherein said step of masking includes the step of masking off the four most significant bits of an intermediate random number, thereby leaving a 28-bit reduced intermediate random number.

19. The method of claim 18, wherein four different intermediate random numbers are stored in said shift register means, wherein a first intermediate random number is shifted 84 bit places to the left, a second intermediate random number is shifted 56 bit places to the left, a third intermediate random number is shifted 28 bit places to the left and a fourth intermediate random number remains unshifted.

20. The method of claim 19, wherein said first through fourth intermediate random numbers are logically ORed together to produce a 112-bit high precision number.

21. The method of claim 19, wherein a seed value is used to generate said intermediate random numbers and wherein an initial seed value is exclusively-ORed with a bit string representation of the current time and date prior to use as said seed value, thereby further increasing the randomness of said seed value.

22. The method of claim 19, wherein the seed values for said second through fourth intermediate random numbers are each shifted one bit left prior to their use in generating said intermediate random numbers.

23. The method of claim 16, further including the step of outputting said high precision number to a remote location for use as a data encryption communications security key.

24. The method of claim 16, wherein said linear congruential transformation is in the form of:

$$X_{i+1} = (ax_i + b) \bmod m$$

where, $n \geq 0$, a=multiplier, b=increment, and m=modulus.

25. The method of claim 24, wherein the multiplier is 16807 and the prime modulus is $2^{31}-1$.

26. The method of claim 16, wherein said intermediate random numbers are generated from a portable digital computer.

* * * * *